G. G. WOLFE.
Parlor-Stove.

No. 208,659. Patented Oct. 1, 1878.

WITNESSES:
Francis O. Alsop
C. M. Velsey

INVENTOR:
Gurdon G. Wolfe

UNITED STATES PATENT OFFICE.

GURDON G. WOLFE, OF TROY, NEW YORK, ASSIGNOR TO WOLFE STOVE COMPANY, OF SAME PLACE.

IMPROVEMENT IN PARLOR-STOVES.

Specification forming part of Letters Patent No. 208,659, dated October 1, 1878; application filed August 20, 1878.

*To all whom it may concern:*

Be it known that I, GURDON G. WOLFE, of the city of Troy, in the county of Rensselaer and State of New York, have invented a new and useful Improvement in Parlor-Stoves, of which the following is a specification, reference being had to the accompanying drawing.

The principal object of this invention is to provide very simple and cheap means whereby the exterior design of the laterally-projecting base of an ornamental stove can be easily, neatly, and quickly changed from a circular shape to an angular form, and from angular form to a circular shape, without making a new and different base-plate, and while one and the same permanent base-plate remains embodied in the stove.

I accomplish that object by combining, with a stove having a permanent laterally-projecting base-plate of a circular or an angular external shape, a supplemental removable rim-plate fitting upon and around outside of the said permanent base-plate, and detachably secured to the latter, and externally of an angular form when the said permanent base-plate is of a circular shape, and of a circular shape when the said permanent base-plate is of an angular form, so that by removing the said rim-plate from and resecuring it upon the said permanent base-plate the design of the base of the stove will be changed from an angular shape to a circular form and from a circular form to an angular shape, whereby different tastes and requirements of purchasers and users of the stove can be met and gratified.

Figure 1:
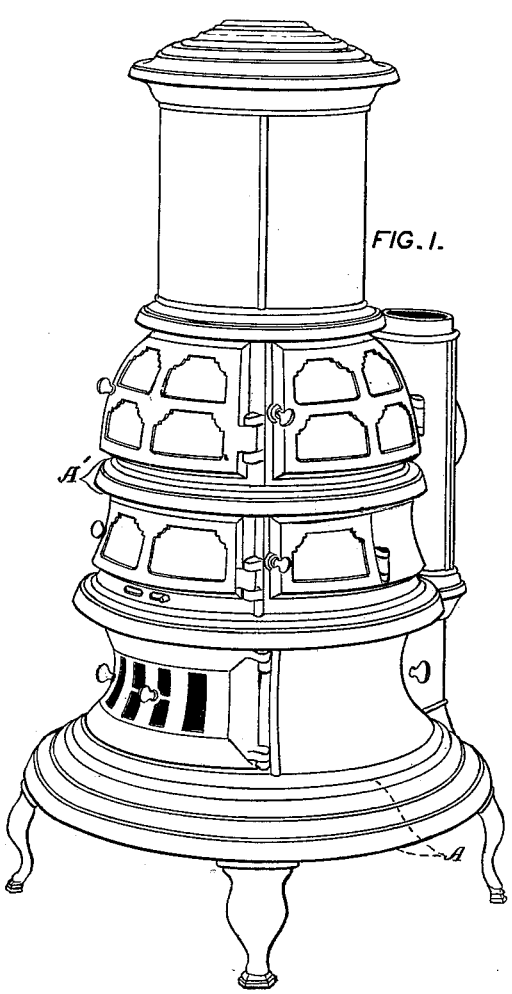
Figure 2:
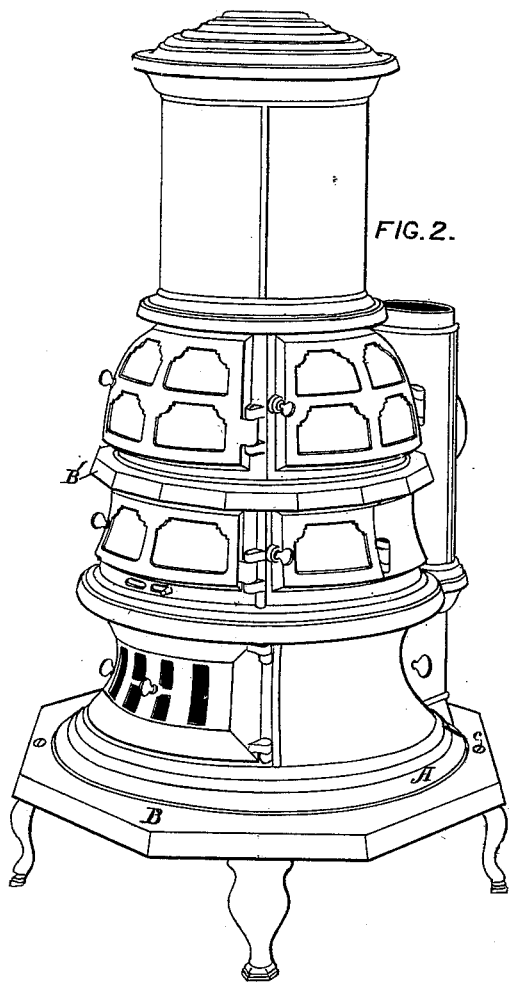
Figure 4:
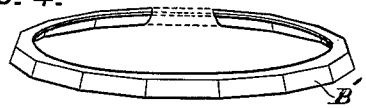
Figure 6:
Figure 3:
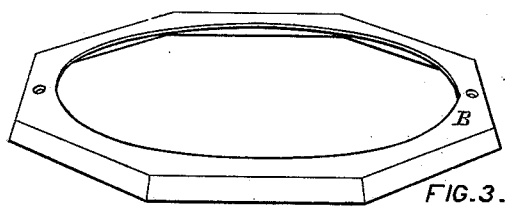
Figure 5:
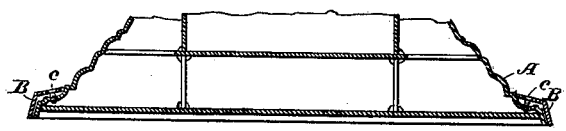

In the aforesaid drawing, Figure 1 is a perspective view of a stove having upper and lower sections, provided with circular laterally-projecting plates, which are permanently mounted in the stove, as usual. Fig. 2 is a perspective view of the same stove, having combined with two of the permanent laterally-projecting plates thereof two supplemental rim-plates, which are shown detached and separate in Figs. 3 and 4. Figs. 5 and 6 are vertical sections of parts of the same stove, with the same rim-plates secured thereon as in Fig. 2.

A A' are two permanent laterally-projecting plates of lower and upper sections of the stove, and are shown of circular form externally. B B' are two supplemental rim-plates, of angular form externally, and are shown in Fig. 2 fitting upon and around the outer portion of the corresponding permanent plates A A', and detachably secured to the latter by bolts or screws $c\,c$, as indicated in Figs. 5 and 6, so that either of the two rim-plates B B' can be readily detached and removed from and replaced, and resecured upon the outer portion of the corresponding permanent plate.

By thus merely combining the light and cheap detachable rim-plate B, of angular shape externally, with the corresponding permanent base-plate A, of circular external form, as shown in Fig. 2, the design of the outer portion of the base of the stove is changed from the circular form shown in Fig. 1 to the angular shape represented in Fig. 2, and the design of the outer portion of the base of the stove can be changed from the angular shape represented in Fig. 2 into the circular form shown in Fig. 1 by merely removing the rim-plate B. By having the outer portion of the permanent base-plate A of the stove in an angular form, and combining therewith a removable rim-plate, B, of a circular external shape, I secure a similar advantageous result.

What I claim as my invention is—

The combination, with a stove having a permanent laterally-projecting base-plate, A, of a removable rim-plate, B, fitting around and upon the said permanent base-plate, and detachably secured thereto, the said permanent base-plate and removable rim-plate being respectively of circular form and angular shape externally, as shown and described.

In testimony whereof I hereunto set my hand in the presence of two subscribing witnesses this 17th day of August, 1878.

GURDON G. WOLFE.

Witnesses:
 FRANCIS O. ALSOP,
 C. M. VELSEY.